March 6, 1956 T. ROWLANDS 2,737,238
APPARATUS FOR CUTTING AND CREASING SHEET MATERIAL
Filed May 22, 1952 9 Sheets-Sheet 1
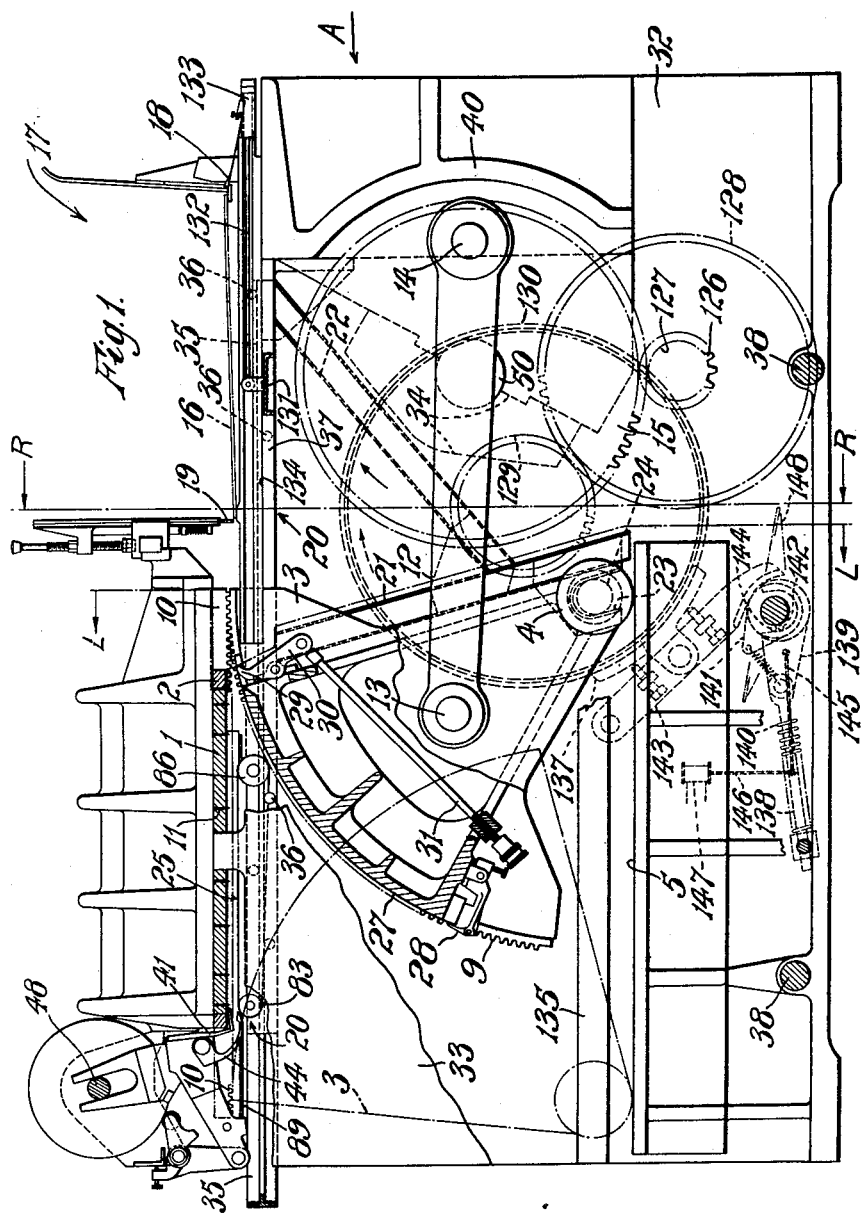
INVENTOR
Tom Rowlands
By Watson, Cole, Grindle & Watson
ATTORNEYS March 6, 1956     T. ROWLANDS     2,737,238
APPARATUS FOR CUTTING AND CREASING SHEET MATERIAL
Filed May 22, 1952     9 Sheets-Sheet 2
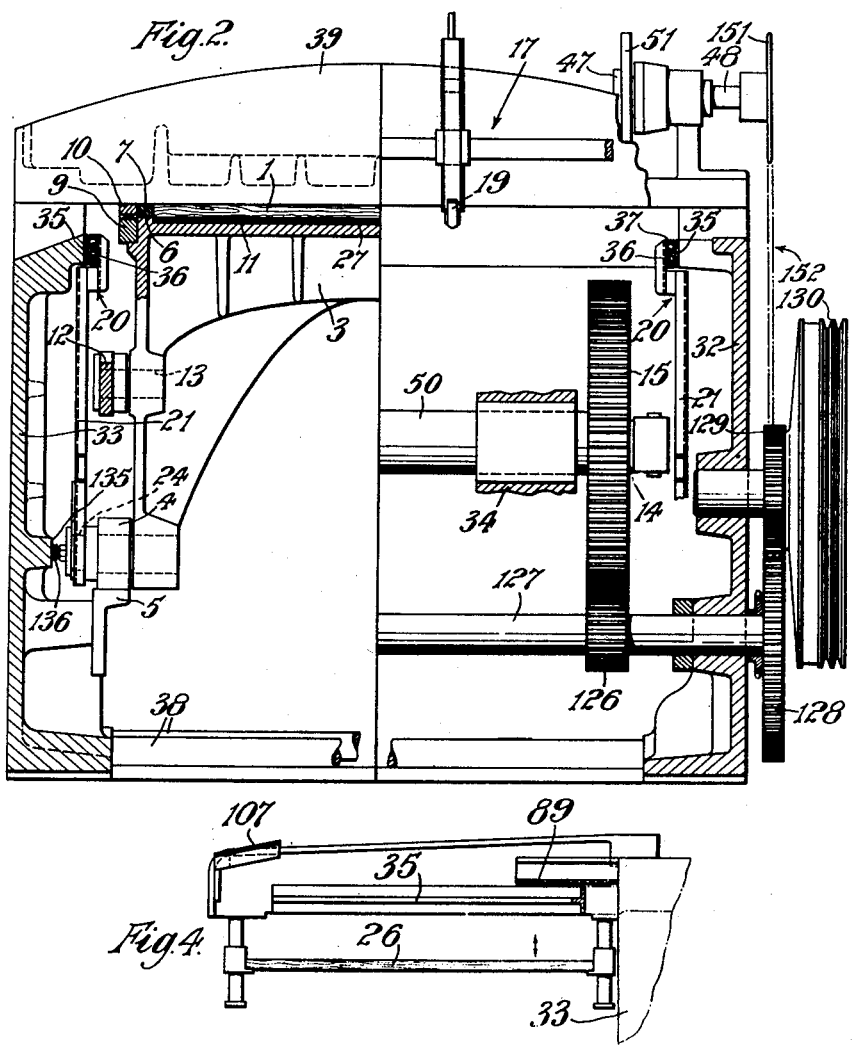

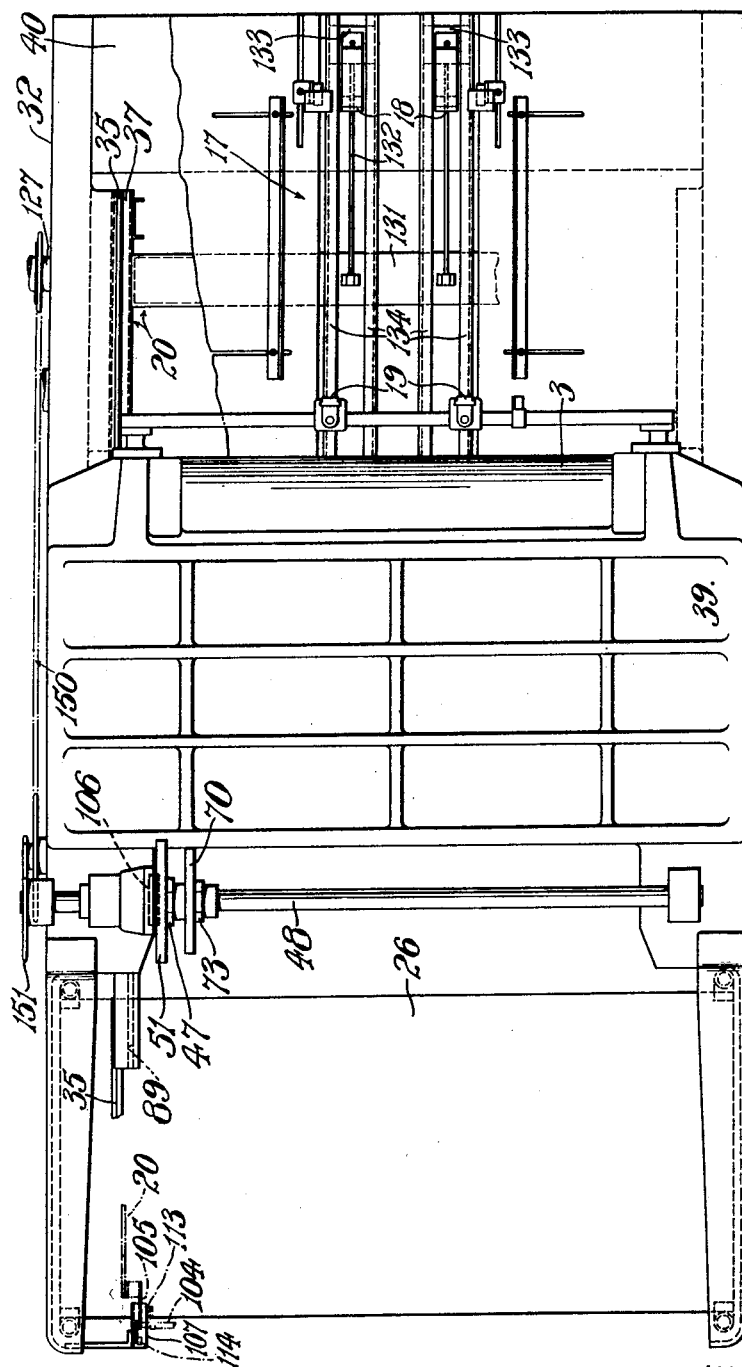

March 6, 1956  T. ROWLANDS  2,737,238
APPARATUS FOR CUTTING AND CREASING SHEET MATERIAL
Filed May 22, 1952  9 Sheets-Sheet 4

INVENTOR
Tom Rowlands
By Watson, Cole, Grindle & Watson
ATTORNEYS

March 6, 1956 T. ROWLANDS 2,737,238
APPARATUS FOR CUTTING AND CREASING SHEET MATERIAL
Filed May 22, 1952 9 Sheets-Sheet 8
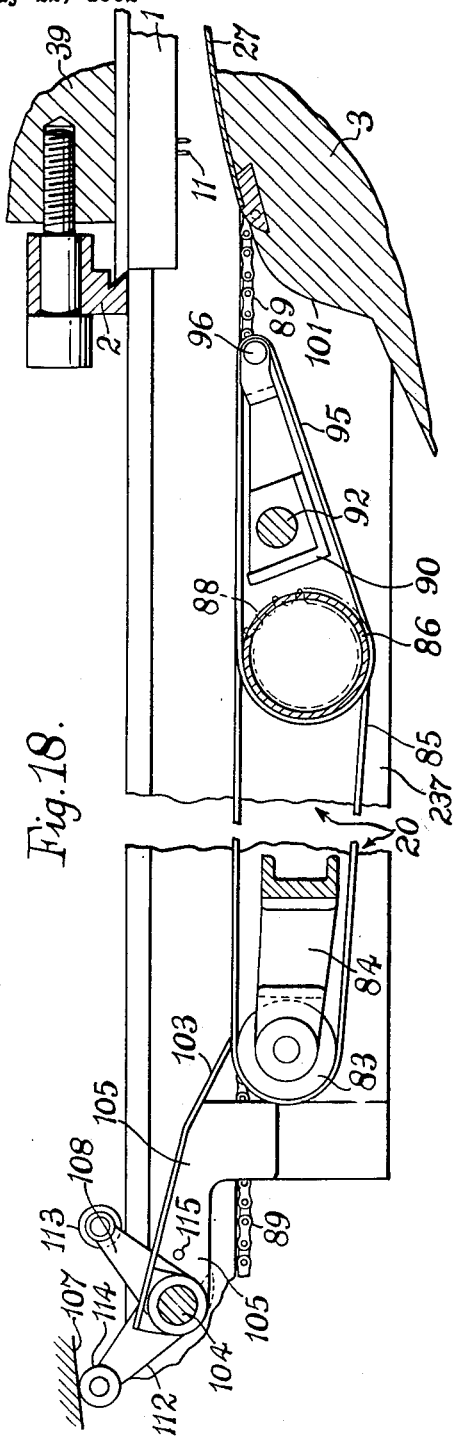
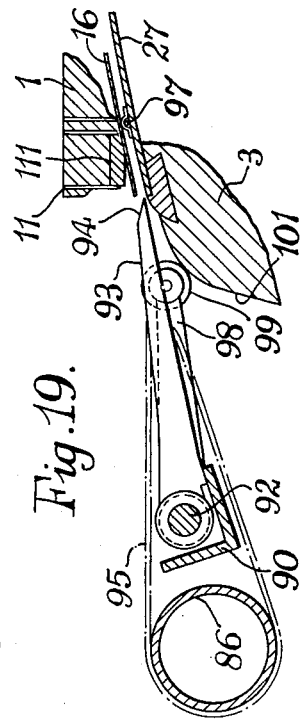
INVENTOR
Tom Rowlands
BY Watson, Cole,
Grindle & Watson
ATTORNEYS

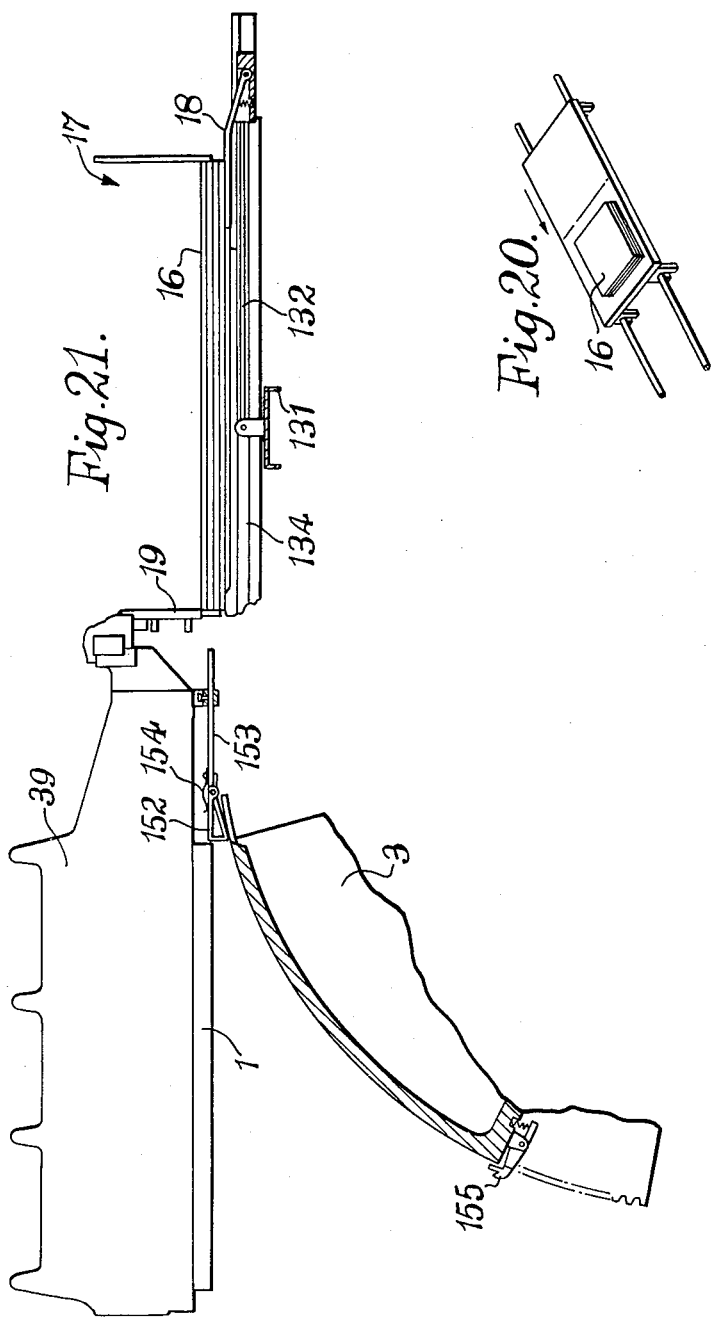

United States Patent Office 2,737,238
Patented Mar. 6, 1956

2,737,238

APPARATUS FOR CUTTING AND CREASING SHEET MATERIAL

Tom Rowlands, Keston, England, assignor to The Thrissell Engineering Company, Limited, Bristol, England, a British company Application May 22, 1952, Serial No. 289,404

Claims priority, application Great Britain May 25, 1951

10 Claims. (Cl. 164—21)

This invention concerns improvements in or relating to machines for performing cutting, creasing, embossing and like operations on paper, cardboard and like materials.

Machines for this purpose are already known and used for such work as cutting out advertisements, greeting cards, jigsaw puzzles, gaskets and so on from paper, cardboard, thin cork and other suitable materials, the machines operating to cut through a sheet without actually removing any parts. Where there is a risk of parts becoming detached, suitable interruptions are made in the cut to avoid this. After the sheets are taken from the machine they are joggled up into a comparatively uniform pile and are then struck by hammers or mallets to dislodge all the cut-out parts, the reason being that if cut-out parts fall out or are removed in the machine, they cause great hindrance in the operation. For brevity, work produced by such machines will be hereafter termed "cut-outs."

At present, two main types of machine, namely platen type and drum type, are used for the purpose of making these cut-outs. The first type is a platen press having a hinged jaw and a fixed jaw, which generally carries the cutting forme, while the other jaw is provided with a tympan or like support for the sheet of material which is to be cut. The jaws are closed by any suitable mechanism, for example, a crank and connecting rod, and it will be readily seen that as the cut takes place over the whole area of the sheet almost at the same instant, enormous pressures are required. This means a heavily constructed machine in which the working parts are subjected to intense wear, and moreover, the removal of a cut sheet is a somewhat difficult operation because, in general, these machines are constructed with the plane of the jaws substantially vertical and in removing the sheet there is a risk of some of the cut-out parts becoming dislodged from the sheet and falling into the machine. Another machine of the platen type takes the form of a press, where usually a fixed cross-head in a horizontal plane is employed and a reciprocating platen (operated either by crank and connecting rod, or toggles), carries the forme as already described. This machine also cuts the whole area of the sheet at one time and involves massive construction, and the feeding and removal of the sheet while the press is open is complicated and comparatively slow, because whenever the sheet is being moved no cutting can take place. The other type of machine used for this purpose is substantially of the construction of an ordinary flat bed printing press with an impression roller, and in this case the forme is carried on the bed and the roller exerts the necessary pressure on a sheet of material which is laid over the forme. This construction gives much easier cutting than in the other type of machine, because cutting only takes place over a line as the bed reciprocates beneath the roller, the roller merely being provided to exert the necessary pressure. In practice, machines of this kind are usually ordinary printing machines suitably set up for the purpose. Since the roller circumference must be considerably larger than the sheet, to accommodate grippers or claws, these machines are usually very bulky compared with a platen type machine. It will also be seen that as the sheet must be bent round the roller, the thickness of material which can be handled by this type of machine is limited, for example, thick cardboard would crack while being bent and some materials such as corrugated board could not be handled in any thickness. Moreover a printing machine is not really constructed for such arduous work.

The forme is usually constructed nowadays from a sheet of thick plywood on which the pattern of the cutout is traced and the wood is then sawn around on the lines of the pattern, the saw being of such thickness that cutting rule can be inserted in the saw-cuts to provide cutting edges for the pattern desired, any system of wedging being applied when necessary. At suitable parts along the cutting rule there are provided strippers or ejectors consisting of pieces of rubber, cork, or other resilient material, stuck to the plywood and so arranged that in the cutting operation they are squeezed down and when the pressure is released they spring up and strip the sheet from the cutting edges. If it is desired to emboss part of the sheet, a suitable embossing die is provided, part of which is mounted in the forme, the other part being fixed to the tympan, or where embossing is of a very shallow and plain nature, a single die fixed in the forme may suffice if the tympan is suitably backed up at the appropriate places when the machine is made-ready.

According to the invention there is provided a machine for cutting, creasing, and embossing, comprising a chase carrying a forme, and a presser member consisting of a segment of a drum and having a pressing surface shaped as a circular arc which is adapted to be translated along the forme and during such movement to roll against the forme, a roller journaled at the geometric center of the arc of the pressing surface, a plane surface on which the roller rolls as the pressing surface rolls on the forme, said plane forming a reaction surface providing the necessary pressure between the pressing surface of the forme, and crank and connecting rod mechanism for imparting movements to the segment, the connecting rod being pivoted to the segment at a point between its surface and its center of curvature.

Guide strips may be provided on which arcuate surfaces of the segment can roll so as to provide accurate control over the movements of the segment and maintain its centre on a straight line.

The segment may be moved to and fro on the forme by gear teeth on the segment which roll in a fixed rack when a rotational force is applied to the segment by the connecting rod; the pitch line of the rack coinciding with the surface of the segment during the movement.

Preferably the forme is arranged to face downwards with the segment movable beneath the forme.

Sheets may be fed to the press by any suitable sheet feeding device, such as a magazine containing a pile of sheets and a reciprocating feed pawl to remove the lowest sheet at each stroke. Sheets fed to the machine may be carried into the cutting position by a support or feed grill arranged to move to and fro with the segment. The movement may be imparted by coupling the grill to the centre of curvature of the segment whereby the grill is moved a greater distance at each stroke than the pivot of the connecting rod to the segment.

In combination with the grill there may be provided a travelling tape delivery device of known kind to receive sheets from the grill and deliver them to a pile.

The sheet may be positioned relatively to the forme by a gripper device adapted to seize the leading end of the sheet and draw it against a stop or lay on the segment. This gripper device may comprise a gripper member fixed to a movable support and a co-operating gripper pivoted in said support with means for oscillating the pivoted gripper on its pivot and means for moving the support when a sheet is gripped by the gripper to cause said sheet to be pulled against a stop on the segment to locate its leading end in position. The device may further comprise means whereby gripping engagement is resilient during the pulling movement and means for thereafter locking the gripper tightly to prevent displacement of the gripped sheet.

The invention will be more fully described with reference to the accompanying drawings which show an example of a machine constructed according to the invention.

In the drawings:

Figure 1 is a side elevation of the main part of the machine, partly in section and with most of the near side frame broken away to expose the interior.

Figure 2 is an end view of Figure 1 looking in the direction of the arrow A, the left-hand half of the view being a section on L—L, Figure 1, and the right-hand half a section on R—R, Figure 1, but showing also some gear wheels in advance of the section.

Figure 3 is a plan view of the machine, the driving shaft being broken away.

Figure 4 is a continuation of Figure 1, with some chain lines indicating how the view joins that figure.

Figure 18 is a section of Figure 17 on the line 18—18 and also shows some other parts of the machine.

Figure 19 is a section of Figure 17 on the line 19—19.

Figure 20 is a perspective view of a delivery table.

Figure 21 is a fragment of Figure 1 modified for feeding thick sheets or boards.

Figure 5:
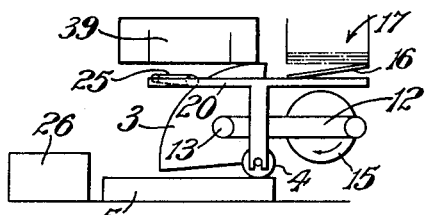
Figures 5 to 14 are diagrams illustrating the motion of the machine.
Figure 10:
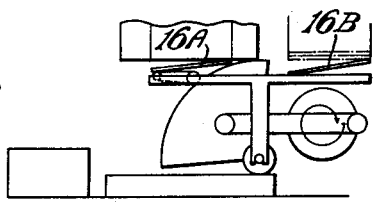
Figure 6:
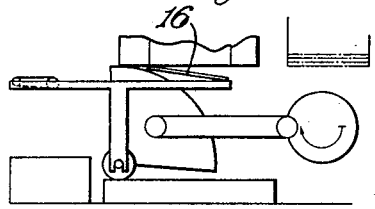
Figure 11:
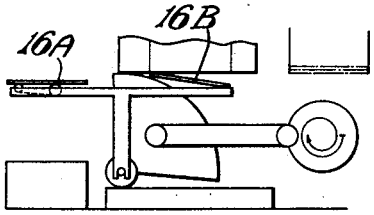
Figure 7:
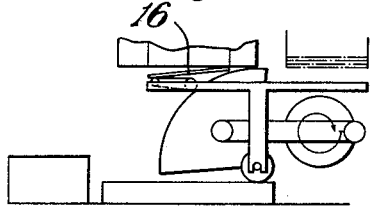

Referring to the drawings a forme 1 is mounted in any suitable kind of chase 2 so that the operative face of the forme faces downwards. The forme shown in Figure 1 consists of a wooden body in which cutting rules 11 are inserted to form any desired pattern. Beneath the chase there is arranged a drum segment 3 whose arcuate face is of sufficient extent to cover the whole face of the forme when the drum segment is rolled over it. At the centre of the arc of the drum segment there is provided at each side of the machine a roller 4 and a suitable guide or plane surface 5 is provided over which this roller can roll when the drum segment rolls on the forme, the roller and plane surface providing the necessary reaction and pressure to force a sheet of material to be operated on, against the forme to cut out the pattern. In order that the drum segment shall execute the desired rolling action, it is provided with arcuate guides 6 which roll on plane guide strips 7 at each side of the machine and the drum is also provided at each side with gear teeth 9 which roll in racks 10 fixed to the machine, the pitch line of the gear teeth in both elements coinciding with the plane of the guides 7 on which the arcuate parts 6 of the drum segment 3 roll. From the foregoing it will be understood that if the drum segment is actuated in a suitable manner, the gear teeth of the segment will roll along the rack teeth and the rollers 4 of the segment will roll along the plane guides 5 so that a sheet of material held against the face of the forme is pressed against the cutting edges 11 thereof, the pressure taking place on a line which moves along from one end of the forme to the other as the drum segment is operated.

For operating the drum segment there is provided a connecting rod 12 which is pivoted to the drum segment at 13 on the central radius thereof and at the centre of said radius, the connecting rod being attached at its other end to a crank pin 14 fixed in a crank disc 15 of suitable throw. In the present case a connecting rod is attached at both sides of the segment, the crank disc being also duplicated. As a matter of convenience these crank discs are formed as spur gear wheels so that they can be gear driven, as explained later.

Sheets 16 of material to be fed one at a time into the machine for the cutting operation are stacked in a magazine 17 which is located substantially above the axis of the crank discs and a reciprocating tooth or feed pawl 18 is provided, whereby each time the tooth or pawl reciprocates, the lowest sheet of the pile is fed out of the magazine beneath an adjustable gate 19 of usual kind. In feeding, the sheet 16 is moved towards the forme and the drum segment. The actual transport of the sheet from the magazine to the forme is effected by a support device 20 known as a grill, because it is of open work construction. The grill comprises a horizontal portion which lies beneath the face of the forme and parallel thereto, and from the lower side of the horizontal portion at each side there is a downwardly projecting structure comprising struts 21 and 22 braced together as shown in Figure 1. At the lower end each member 21, which terminates just above the plane guide on which the roller runs, is slotted at 23 to form a housing for a pin 24 projecting from the axis of the neighbouring reaction roller 4 and with this arrangement it will be seen that as the drum segment rolls to and fro on the racks and the guides which support the reaction rollers, the feed grill is also traversed to and fro. The grill also operates the feed tooth 18. For this purpose a cross member 131, Figures 1 and 3, of the grill has attached thereto a long rod 132, which is attached at its other end to a slide 133 on which the feed tooth is supported. This slide runs in guides 134 fixed to the end frame 40. In Figure 1 the drum segment is shown in full lines at one end of its movement and in chain lines at the other end. As previously explained, the connecting rods are pivoted to the drum segment half-way between the periphery thereof and the reaction roller centres and thus, as the grill is traversed by being coupled to said centres its horizontal movement will be twice that of the connecting rod pivots.

The operation of the devices so far described will now be dealt with, with reference to the diagrams, Figures 5 to 14. As indicated in Figure 5, each connecting rod 12 is on the outer dead centre of its crank disc 15, and the drum segment 3 is at one end of its movement, that is, the nearest position to the magazine 17. As the machine operates, the crank discs move in the direction of the curved arrow, Figure 5, and the feed pawl will pull a sheet 16 out from the magazine and this will drop down on to the face of the feed grill 20 at the magazine end and be carried along thereby towards the forme. In these diagrams the grill is shown as a simple T shape. After the crank discs have rotated half a revolution from the position just mentioned, see Figure 6, the drum segment has rolled completely along the face of the forme taking the grill with it and the sheet of material previously carried on the grill has had its leading end raised, because the movement has brought it into contact with the arc of the drum segment and the leading edge is now in contact with the forme, while the rear edge is still resting on the grill. After the crank discs execute a further half-revolution, Figure 7, the drum segment has been taken back to its first position and during the movement it rolls the sheet of material against the face of the forme with considerable pressure and causes the pattern to be cut in said sheet.

The other end of the grill, that is the end remote from the magazine and which constitutes the delivery end, is provided with a conveyor tape system 25 of the kind common on printing machines, where the tapes are moved at a rate equal to the rate of the moving grill on its return stroke, but in the opposite direction. Details of the conveyor will be given later. When the drum returns to its original position, in the manner just referred to (Figure 7), the leading end of the cut sheet of material drops on to this travelling conveyor and if the machine is operated through a further half-revolution of the crank discs, see Figure 8, when the grill is brought again to its extreme position away from the magazine, the sheet of material is carried well away from the forme and during the return movement of the grill and drum segment the moving tapes will cause the sheet to stay still relatively to the machine as the grill and the tapes return to the position shown in Figure 9, and the finished sheet can therefore drop downwards on to a table 26 as the grill returns. For the return movement, just referred to, the crank discs are driven through a further half-revolution, that is two revolutions in all from the original starting position, and the drum segment and grill are now returned to their original position and on the next outward stroke a fresh sheet will be fed. These movements are indicated in Figures 6 to 9 by curved arrows whose length shows the amount of crank disc revolution from the beginning of the series of movements described.

The operation of the machine has been described for clearness by considering the positions of the parts for four movements of half a revolution each, but it should be appreciated that after the first sheet has passed through the machine some motions are taking place simultaneously. For instance, see Figure 10 (which corresponds in position to Figure 7, that is, the machine has executed one revolution), at the time the leading edge of a cut sheet 16A is dropped down on to the conveyor tapes a fresh sheet 16B is being engaged by the feed pawl and will be fed as the grill and drum segment make their next movement away from the magazine so that while a finshed sheet is falling away from the forme on to the conveyor, a fresh sheet 16B is falling from the magazine on to the grill and in this way, at each revolution of the machine a finished sheet is delivered on to the delivery table. Similarly, Figure 11, while the cut sheet 16A is being carried away on the conveyor, the fresh sheet 16B is being engaged by the drum segment. As this goes back, Figure 12, the cut sheet 16A has been dropped by the conveyor.

Figure 12:
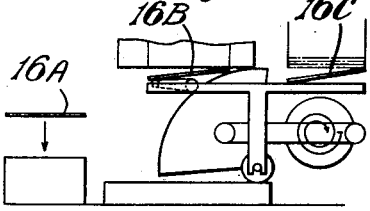
Figure 8:
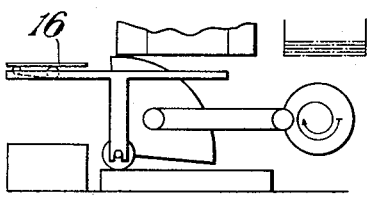
Figure 13:
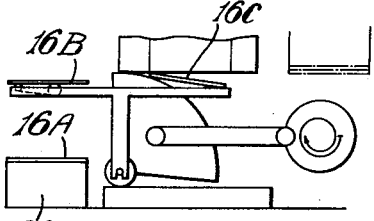
Figure 9:
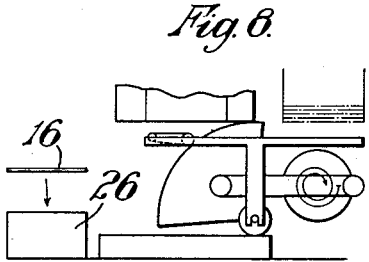
Figure 14:
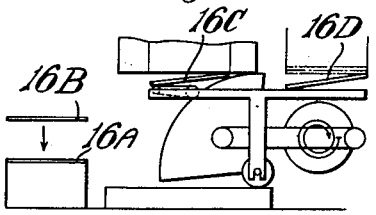

Thus in Figure 12, the sheet 16A is falling, 16B has just dropped on to the conveyor and a further fresh sheet 16C will be fed as the grill goes to the left. In Figure 13 sheet 16A has been delivered to the table 26, 16B is on the tapes and 16C is about to be cut. In Figure 14, 16B has been dropped, 16C is just dropping to the conveyor and another fresh sheet 16D will be fed as the grill goes to the left.

The construction so far described has related to the fundamental parts of the machine and it is now necessary to deal with various auxiliary features and details of general construction.

In order to reduce to mass of the moving parts, the drum segment is made of a fairly light alloy casting not suitable to resist the wear of the cutting operation, so a tympan 27 is provided, formed by a steel sheet stretched over the rolling face of the segment 3. The sheet is fixed at one end by a clamp 28, and a clamp 29 grips the other end. This clamp 29 is constituted by one end of a pivoted lever 30 movable by an adjusting screw 31 to engage the tympan 27 and stretch it over the segment 3. It will, of course, be understood that there may be more than one adjusting screw, for instance two, the number depending to some extent on the width of the tympan and the nature of the clamp. The tympan not only serves to protect the expensive finish of the drum segment but also permits packing to be used as "make-ready." The tympan is reversible, end for end, in order to present a fresh surface to any fixed cutting knife. Even if a cast-iron drum segment is used a tympan is still desirable to protest the finish of the surface.

The framework of the machine comprises a pair of substantial side frames 32 and 33 on which the plane guides 5 for the reaction rollers are fixed. An end frame 40 connects the side frames together and is provided with bearings 34 for a shaft 50 which carries the crank discs. On a level with the feed grill there are fixed to the frames, guides 35 of T section on which rollers 36 attached to the feed grill run. Two sets of rollers are fitted in the upper member 37 of the grill which is of channel section. There is a member 37 at each side of the grill and the upper set of rollers runs on the top surface of the stem of the T and the lower set runs on the lower surface of the stem, see Figure 2. The grill is thus effectively guided without undue friction.

The bottoms of the side frames are fixed together by tie bars or stretchers 38 and across the top is a substantial casting or cross-head 39 to which the chase 2 is attached and forming a solid support to take the cutting pressure. The racks 10, and the plane guide strips 7 on which the arcuate guides of the drum segment roll, are fixed to the cross-head, see Figure 2, and it will be appreciated that with this construction the true pitch line of the segment gears and the racks is maintained because the teeth are relieved of all pressure other than that required for the rolling movements of the drum segment.

As previously mentioned, the movement of the feed grill away from the magazine causes the sheet 16 to be passed under the forme and at the full stroke of the crank, or travel of the grill, the sheet is correctly positioned. In order to hold the sheet in its proper position while cutting is executed, particularly if it is a thin flexible sheet, a movable gripper is provided, adapted to clamp the leading end of the sheet 16 in proper position with respect to the edge of the forme. Thick sheets or boards may be handled as described later.

Figure 15:
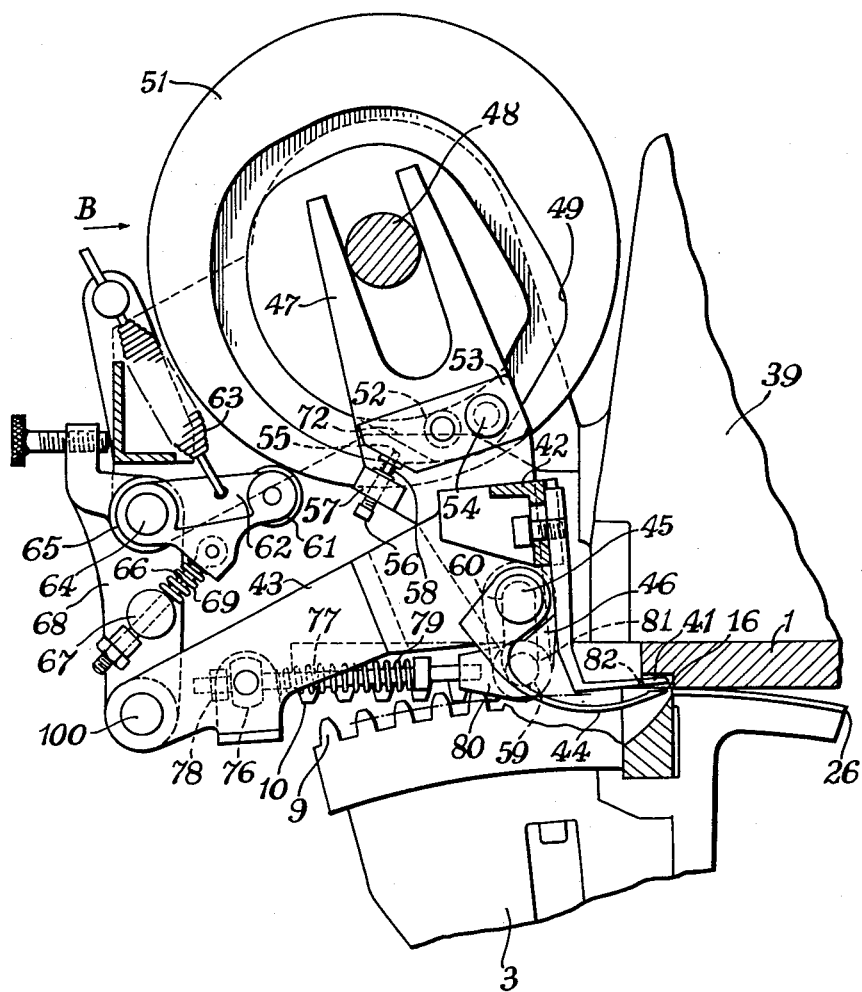
Figure 15 is an enlargement of part of Figure 1 showing a gripper device.
Figure 16:
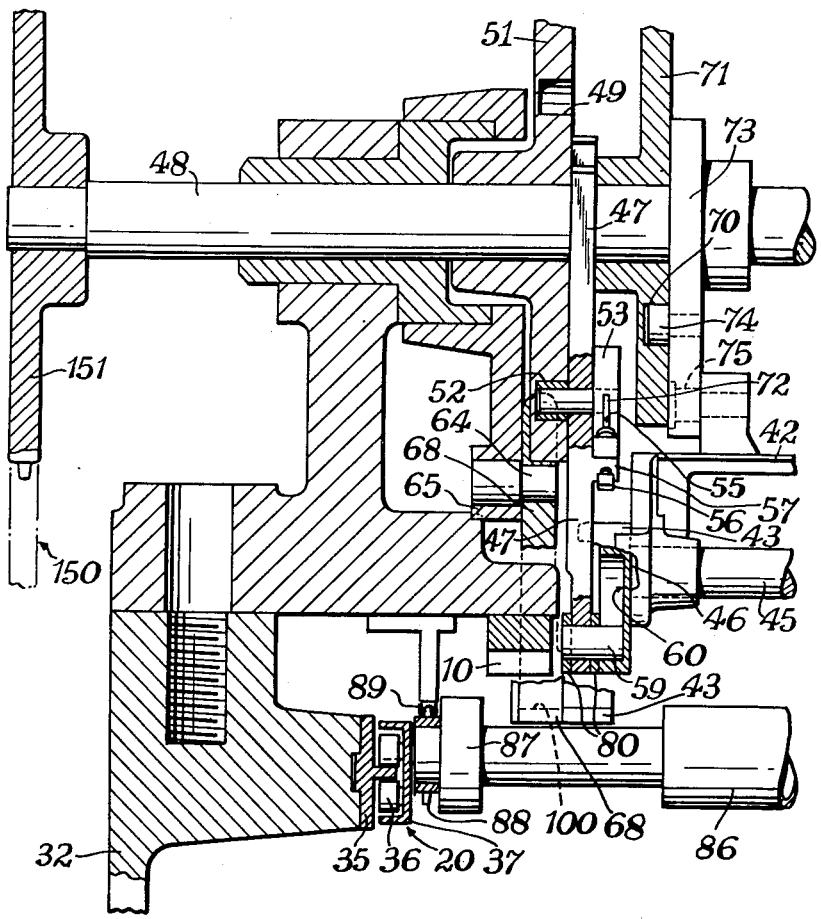
Figure 16 is a view looking in the direction of the arrow B, Figure 15, and partly in section.

The gripper illustrated in Figure 15 and 16 is of the usual double claw-like construction and one or more may be provided according to the width of the sheet, or one continuous gripper may extend the whole width thereof. One claw 41 of the gripper engages the upper surface of the sheet and is supported on an angular crossbar 42 extending across the machine and carried by links 43 pivoted at each side of the machine as described in detail later. Some of the following parts are also duplicated but for simplicity of language only those at one side of the machine are described and it will be easily understood that the gripper device extends across the machine and can be operated by duplicate mechanism at each side. The lower claw 44 is fixed on a gripper operating shaft 45 which is journalled at each end in one of the links 43 which support the cross bar carrying the upper claw of the gripper. To the gripper operating shaft at one end is attached a short lever 46 and to the short lever there is attached, in a manner explained in more detail later, a cam rod 47 which is slotted at the top to slide over a cam shaft 48 on which a substantially disc shaped piece 51 is mounted. In the disc 51 is a cam groove 49. The cam shaft 48 extends across the whole width of the machine at the delivery end and a further cam is provided on it, constituted by a groove 70 in another disc 71. The periphery of the substantially disc shaped piece 51 above-mentioned also constitutes a cam and thus there are three cams which will now be identified as follows:

The cam groove 49 will be termed the main cam and the peripheral cam formed on the same disc 51 will be called the retracting cam while the second cam groove 70 is the gripper carriage cam.

A roller 52 runs in the groove 49 of the main cam but this roller is specially mounted, being supported by a plate 53 which is pivoted at 54 on the main cam rod 47 (hereafter called the main cam rod) and able to move on its pivot under some conditions. The plate is pivoted at one end, with the roller 52 about the mid-length of the plate, while at the other end there is arranged a guide pin 55 which enters a slot 72 in the plate 53 and is formed on the end of a screw 56, threaded in a bracket 57 formed on the main cam rod 47. Between bracket and plate is a stout compression spring 58, supported on the guide pin 55 and urging the plate 53 to swing on its pivot 54 and away from the bracket 57, this movement being ordinarily resisted by the cam roller 52 housed in the main cam groove 49. The purpose of the arrangement just described is to provide a certain amount of flexibility in the grip of the gripper until later on the spring 58 is compressed solid when the gripper-lock position is reached. The lower end of the main cam rod has attached thereto a stud 59 which engages in an elongated slot 60, formed in the aforesaid short lever 46 which is attached to the gripper operating shaft 45. As the main cam rotates, the lower claw of the gripper is swung to and fro as the gripper operating shaft swings on its journals. It is necessary, as will be explained later, for the lower claw to be locked in gripping position, but a description of the parts necessary for locking is deferred.

The retracting cam 51 has about 220° of its periphery concentric with the axis of the cam shaft and the remainder slightly eccentric thereto, said part being formed as a substantially circular arc whose radius at its middle point is about 4 m./m. less than the radius of the concentric part of the cam. A cam roller 61 on a lever 62 is urged against the cam by a strong spring 63 and the roller lever which is pivoted at 64 on a fixed bracket 65 has pivotally attached thereto a thrust rod 66 which passes through a stud 67 mounted in a lever 68, pivoted on the same axis 64 as the cam roller lever 62 and which hangs downwards substantially vertically from the fixed bracket 65, with a strong compression spring 69 interposed between the roller lever and the stud 67. Thus as the disc cam 51 rotates, resilient pressure is exerted on the stud for about 220° of the revolution and the hanging lever 68 will swing on its pivot. At the lower end of the hanging lever is pivoted at 100 the link 43 to which is fixed the cross bar 42 carrying the upper gripper claw 41.

The gripper carriage cam is provided with a slotted cam rod 73, the carriage cam rod, having a roller 74 which runs in the cam groove 70. The lower end of the rod 73 is pivoted at 75 to the cross bar 42 and as the cam rotates, the cross bar 42 will rise and fall. A stud 76 fixed in the cross bar supporting link 43 has a threaded rod 77 passing through it with an adjusting nut 78 on one side and a compression spring 79 on the other side. The other end of the threaded rod has an eye or clevis 80 fixed on it in which fits the stud 59 carried on the main cam rod 47 and housed in the slot 60 of the aforesaid short lever 46. The slot 60 is the same width as the stud 59 at the end of the main cam lever, see Figure 15, and at the pivot of the lever, that is, the axis of the gripper operating shaft 45, the upper end of the slot is semicircular and concentric with the pivot. The slot then extends parallel to the lever's long axis and just before it reaches the centre of the free end of the lever, which is substantially semicircular in shape, the slot turns sideways then turns again towards the aforesaid centre of the lever end where it is shaped as a concentric arc of about 180° and from Figure 15 it will be seen that between the straight part and the lower concentric arc there is on one side of the slot a small hump or projection 81.

The operation of the gripper is as follows:

As previously stated the law 41 of the gripper engages the upper surface of the sheet 16. When a sheet is fed under the forme as far as the grill will take it, the top gripper 41 will be lower than the forme but overlapping the top surface of the sheet. The rotary movement of the cam groove 49 now causes the main cam rod 47 to descend and since the stud 59 at its lower end engages with the slot 60 in the short lever 46 on the gripper operating shaft 45, the lower gripper 44 is caused to swing towards the top gripper. The main cam rod 47 continues to descend. Meanwhile the linkage by the carriage cam rod 73 to the gripper carriage cam 70 maintains the top gripper 41 attached to the cross bar 42 at a constant level, and provides resistance to prevent the gripper cross bar support links 43 from moving. When the stud 59 in the lower end of the main cam rod 47 meets the resistance of the projection or hump 81 in the slot 60 of the short lever 46 the compression spring 58 located about the small guide pin 55 which enters the plate 53 carrying the main cam roller 52 begins to compress, thereby affording a resilient pressure between the bottom gripper 44 and the temporarily held top gripper 41. During these conditions the cam roller 61 engaging the periphery of the retracting cam 51 is forced downwards by virtue of the rise due to the cam's shape at this part of the rotation. This cam roller 61 in turn transfers its motion through the compression spring 69 to the stud 67 on the hanging lever 68 which causes the whole gripper frame to retract a very limited amount in the same direction as the sheet is moved through the machine, that is, leftwards as seen in Figure 15. The object of this slight movement taking place in time to coincide with the resilient pressure between the upper and lower grippers, is to allow the fed sheet to be aligned against a fixed stop or "lay" 82, Figure 15, mounted upon the part 42; the fixed stop or lay having been so adjusted that register of printing or location of the cuts with respect to the forme is obtained.

Immediately after the short retracting movement, with the compression spring 58 now solid about the small guide pin the main cam rod still descends carrying with it the said stud at its lower end pressing against the hump 81 in the elongated slot. The stud is now compelled to move in a horizontal path since the upper and lower gripper claws are tightly clamped against the sheet. This horizontal movement causes the eye 80, through which the stud passes, to move the threaded rod 77 carrying the adjusting screw and so compress the locking spring 79. At the maximum radius of the main cam track the stud at the lower end of the main cam rod will have passed over the projection in the slot in the short lever and settled into the extreme or circular end of the slot. Thereby a locked position is obtained, but because of their disposition, the gripper cross bar support links 43, with the locked gripper, are free to swing about the pivots 100 on the hanging levers. To permit such movement the groove of the main cam runs out at a part now in the vicinity of the roller on the main cam rod so the gripper is free to move bodily without restraint from the cam. With this construction the gripper accommodates itself easily to various thicknesses of sheets.

Figure 17:
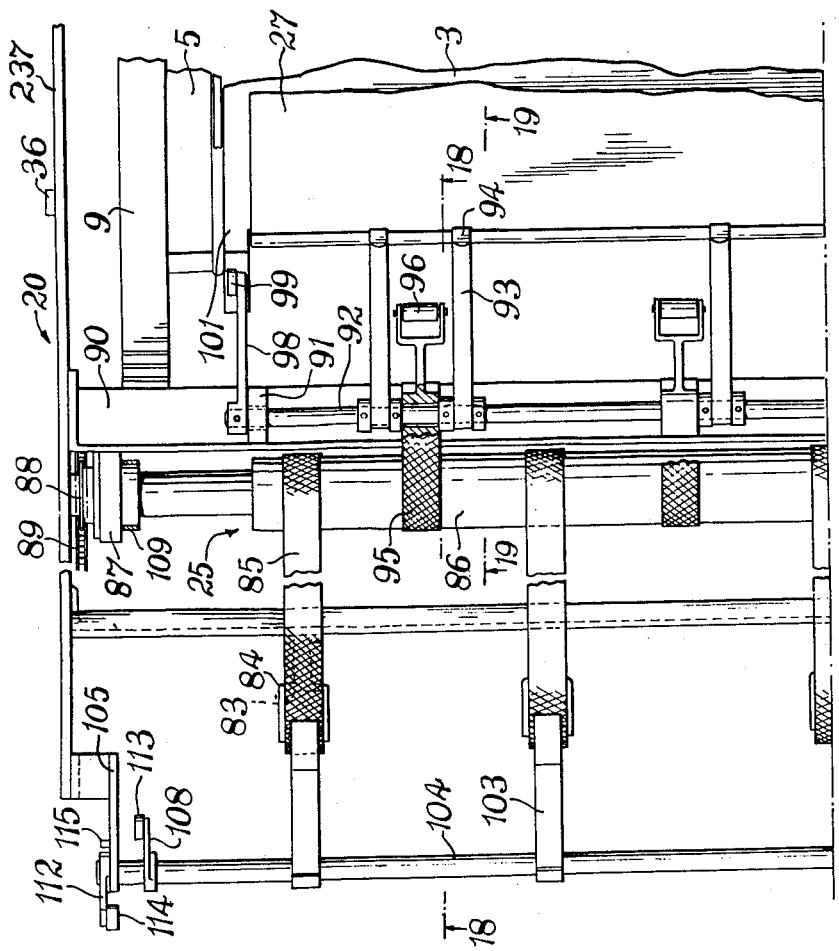
Figure 17 is a plan view of half of a device known as a grill and illustrated partly in Figure 1.

Referring mainly to Figures 17 to 19 the conveyor system 25 previously referred to comprises several tapes 85 carried on a roller 86 which is driven through a free wheel device contained in a case 87. At the other end of the conveyor system these tapes, or main tapes, are supported on separate rollers 83. The driving member of the free wheel is a sprocket wheel 88 driven by a stretched chain 89, see Figures 1 and 16, constituting a rack. In Figures 17 and 18 the sides of the grill are shown as solid bars bearing the reference 237, instead of the channel shaped sides 37 previously described with reference to Figures 1 and 2. As the grill 20 moves away from the magazine the tapes are still, but as it returns they are driven. The rear tape rollers 83 are supported on narrow arms or brackets 84 extending away from the grill frame 20 and so disposed that the arms are practically within the confines of the tape runs, in order to avoid collision with a falling sheet as the grill returns to discharge a further sheet. Beyond the brackets are two or more pivoted grippers 103 supported on a shaft 104 journalled in extensions 105 from the grill frame and adapted to grip a sheet by pressing it against the tape on the rollers 83. As the grill starts to run in to receive a finished sheet on the tapes, the free ends of the grippers 103 are raised away from the rollers but as soon as a sheet is home on the tapes the grippers engage it under the action of a cam 106, Figure 3. The grill runs out with the gripped sheet and at the end of the grill movement the grippers are raised by another cam 107 so that the sheet is free to run off when the tapes start to move with the return movement of the grill. As will be seen from Figure 18, the shaft 104 has cam levers 108 and 112 attached to it with rollers 113 and 114, respectively, at their free ends. The cam 107 is shown diagrammatically in this figure, the cam 106 being similar but inclined the opposite way. As the grill moves in, the roller 113 runs down the slope of cam 106 and closes the grippers 103 to hold the sheet. At the end of the reverse movement of the grill the roller 114 runs down the slope of cam 107 and lifts the gripper, the parts remaining overbalanced against a stop 115, and with the gripper in the open position, until the roller 113 once more meets its cam 106. In Figure 3 the shaft 104 and the cam rollers are shown in chain lines with the roller 114 in engagement with the cam 107. A brake band 109 may be fitted on the tape drive roller 86 to ensure that it comes to rest at the proper times. Discharged sheets are collected in piles on the table 26, Figures 3 and 4, and this may be movable on guides, as in Figure 20, so that as soon as a pile of a desired thickness is collected the table can slide along to provide a fresh delivery supporting surface. This feature is useful for all work but particularly for work on thick boards which speedily form a deep and heavy pile. Thick heavy boards may be fed from the top of a pile by any suitable known top-feeding mechanism.

When the machine is in operation, immediately after the start of the impression, with the drum line of contact moving towards the feed end, the cut sheet is ejected by rubber or cork inserts secured in the forme and acting as ejectors as previously mentioned. The arrangement is shown in Figure 19 where a rubber pad is marked 111. As the sheet begins to leave the forme the edge at the delivery end of the machine droops down until it is in contact with the tympan surface. The sheet must now be stripped from the drum segment and this is achieved by employing a stripping device, mounted within the grill, which is now described. An angular cross-tie 90 mounted across the width of the grill carries bearings 91 which support a light shaft 92. Adjustably mounted upon the shaft are strippers 93 in the form of tapering fingers. The lower edge of each of these strippers adjacent to the angular tie is of such dimensions that the stripper tip is always just a running clearance away from the tympan surface, see Figure 19. This close proximity of the fingers to the moving tympan is sufficient for the strippers to penetrate beneath the aforementioned sheet, and since the strippers are still moving forward with the grill, the sheet is guided on to the tapes of the delivery conveyor. One important feature of the stripper finger design is a steep rise in the contour of the tip at 94, the purpose being to quickly raise the leading edge of the sheet so that should any of the "cut-out" sag downwards from the main surround of the sheet, the "cut-out" cannot get under the stripper tip and so cause incomplete delivery. The strippers lead the sheet on to short tapes 95 from which the sheets slide along over the main tapes 85. The short tapes run over the roller 86 and small rollers 96.

With certain forms of creasing "string make-ready" is employed, which is attached directly on the surface of the tympan. The make-ready is either string or cord situated so that at the moment of creasing the string is pressing the sheet upwards between the creasing rules. Figure 19 shows the arrangement, the string being marked 97 and secured to the segment by adhesive tape requiring such make-ready which holds it fixed in position during the whole run of work. The strippers as previously described would not only strip the sheet but also any make-ready employed. Therefore, at each end of the shaft 92 are fixed arms 98 lying substantially in the same plane as the strippers. At the end of these outer arms are mounted cam rollers 99. At each side of the drum segment 3 outside the tympan area is a narrow path of the drum surface which is of constant radius. By extending this path towards the delivery end a certain amount, and rapidly reducing the radius from the drum centre, a cam track 101, Figure 19, is formed.

The relationship of the cam track to the tip of the stripper 93 is so arranged that, as the grill which carries the stripper assembly approaches the drum segment, the stripper finger tips just skim the tympan surface, so lifting the cut sheet. Immediately after this portion of the stripper travels the cam roller 99 engages with the cam 101 formed on the drum segment 3, and through the arm 98 connected to the tubular shaft 92, raises the stripper fingers clear of the string make-ready. This condition continues during the remainder of the cutting stroke and also during the return feeding stroke until the cam 101 approaches the position shown in Figure 19 when the roller 99 starts to run down the cam.

The crank discs 15 which, as previously mentioned, are toothed wheels are driven by pinions 126 on a shaft 127 which projects on the exterior of the side frame 32 and has fixed thereto a large gear wheel 128. This engages with a smaller gear wheel 129 fixed to a grooved pulley 130 which is the driving wheel of the machine. The pulley is driven by belts from a motor, but these parts are not shown. The cam shaft 48 is driven from shaft 127 by compound chain gearing shown in Figures 2 and 3 and comprising chains 150 and 152, the final drive being by chain 152 to a sprocket wheel 151 on the cam shaft 48.

In order to assist in lateral control of the drum segment, rubbing strips 135 are provided on the frames 32 and 33 against which studs 136 on the drum engage.

As a matter of convenience it is desirable to ensure that the machine stops with the parts (e. g. the grill) in a certain position. For this purpose there is provided a toggle-operated brake, Figure 1, having a shoe 137 adapted to press on the driving pulley 130 when the machine is to stop. The toggle consists of arms 138 and 139 with a strong spring 140 surrounding arm 138. A rotatable cam 141 is moved by an abutment 142 on the arm 139 to press a stud 144 and rotate a lever 143 to which the shoe 137 is pivoted. As shown, the brake is off and the toggle is on its dead centre and can be released by a relatively light upward pressure on the elbow. This pressure is furnished by a lever 145 connected by a link 146 to a solenoid 147 which is operatively coupled to the starting and stopping button switch of the machine. As the stopping button is pressed, the solenoid is energised, the lever 145 is lifted by the link 146 and breaks the toggle whereupon the cam 141 is rotated and the brake put on. At the front of the machine is a pedal 148 whereby the brake can be put on or off at will.

The machine specifically described is suitable for use with hard millboard which, at any rate in the thinner sheets, is fairly flexible so that register of the sheets must be effected by a pulling operation, as by the movable gripper described. If, however, stiff boards such as corrugated boards are to be handled it is possible to simplify the registering arrangements and secure register by a pushing operation. Apart from simplicity, it is preferable to avoid gripping such boards to prevent crushing.

For this purpose the gripper previously described is discarded and the arrangement shown in Figure 21 is used. Back stops 152 hinged to adjustable bars 153 are urged downwards by springs 154 and can rise to the face of the crosshead when pushed up by the drum segment. The stops are so located that they position the board accurately with respect to the forme, as explained below, but if the forme is longer than the board then it is slotted to accommodate the stops. When a board is fed and carried along by the grill it will tend to return with it but this tendency is checked by the back stops. At the forward end of the drum segment are pivoted several spring stops 155 shaped much like feed teeth and each having a board-end engaging-face with an extending lip below the face on to which the leading end of the board runs. As a board contacts with the said face, the stops rock on their pivots under the impact and then push the board back slightly and against the back stops, so that it is properly registered.

It will be seen from the foregoing description that the machine according to the invention combines the advantages of the platen and drum types. The material is fed and cut while flat as in the platen type and the cutting pressure is substantially on a line as in the drum type.

The machine is easily adapted for use as a unit in a cutting and creasing machine of the kind where packet blanks and like articles are cut out of carton board fed from a reel. These machines usually comprise printers and hitherto the cutting and creasing has been done by rollers. These rollers which carry blades are extremely expensive to make, so much so, that their cost for short runs of blanks is prohibitive and usually they are only used for long continuous runs of work.

A creasing and cutting device having a drum segment and a flat forme which is much cheaper than a pair of cutting rollers can be substituted for the cutting rollers and as the material is handled in web form the segment can be at the top and the forme beneath it. This has the advantage that the forme can be readily inspected and as the blades can be adequately supported, a cheaper construction of forme can be used. For some work printer's rule merely wedged in position is good enough. A suitable device is shown in Figure 23.

In operation of the web-fed machine, Figure 23, the web 160 is printed as usual while running continuously between rollers 161. Beyond these, the web loops so that its movement can be interrupted at the cutting and creasing stage. A segment 3 rolls along the web in one direction and makes a cut or crease and runs just out of contact with the forme 1, the web then feeds again by the intermittent motion at 162 and stops and the segment rolls back while it is just out of contact with the forme making another cut during such movement. Thus the segment is enabled to cut on both strokes of the connecting rod and a high output is possible.

What I claim as my invention and desire to secure by Letters Patent is:

1. A machine for cutting and creasing sheet material, comprising, in combination, a chase, a forme carried by said chase and facing downwardly, a segment of a cylinder mounted beneath the forme and having an arcuate pressing surface, said segment being arranged to be rocked so that its pressing surface rolls against said forme with approximate line contact therebetween, the contact being displaced lengthwise of the forme as the segment is rocked thereon, a roller journaled on said segment at the geometric center of the arcuate pressing surface, a plane reaction surface on which the roller rolls as the pressing surface rocks on the forme, mechanism for reciprocating said roller on said reaction surface to operate the segment, a sheet carrier to feed sheets into the machine, said carrier being coupled to the segment for movement to and fro with said center in the direction of displacement of line contact between the pressing surface of the segment and the forme, and extending forwardly and rearwardly of said center to such extent as to occupy, in turn at opposite ends of the stroke of the segment, first a position in which the rearward extension of the carrier lies rearward of the forme to receive a fresh sheet from the feeder and the forward extension of the carrier lies beneath the forme to receive a finished sheet, and second a position in which the forward extension of the carrier lies forward of the forme to deliver the finished sheet and the rearward extension of the carrier lies beneath the forme to present a fresh sheet between the forme and the pressing surface of the segment.

2. A machine for cutting and creasing sheet material, comprising, in combination, a stationary chase, a stationary forme carried by said chase and facing downwardly, a segment of a cylinder mounted beneath the forme and having an arcuate pressing surface, said segment being arranged to be rocked so that its pressing surface rolls against said forme with approximate line contact therebetween, the contact being displaced lengthwise of the forme to and fro as the segment is rocked thereon, feeding means operative during a forward stroke of the segment to feed a sheet forwardly between the forme and the said pressing surface for cutting and creasing thereby on the return stroke, and a sheet receiver, positioned below the level of the forme, and mounted for movement rearwardly, during the said return stroke, between the forme and the pressing surface to receive said sheet from the forme, said sheet receiver comprising a stripping element arranged to pass between the said sheet and the said arcuate pressing surface, during said rearward movement, to strip the sheet from the pressing element.

3. A machine as claimed in claim 2 wherein the said sheet receiver comprises movable surfaces on which said sheet is received, wherein means are provided to move said surfaces forwardly relatively to the sheet receiver as the sheet receiver moves rearwardly, so as to move the said sheet away from the forme and segment.

4. A machine as claimed in claim 2, wherein the sheet receiver is coupled to the segment at its geometric center so as to move with said center at a constant distance from said line contact between the forme and the pressing surface.

5. A machine as claimed in claim 2, wherein the said feeding means comprise a carrier positioned below the level of the forme and mounted for movement between a rearward position to the rear of and clear of the segment and forme, at which position it can receive a sheet to be fed, and a forward position beneath the forme, the said carrier being arranged to move forwardly from the rearward to the forward position during a forward stroke of the segment so as to feed the said sheet between the forme and the said pressing surface.

6. A machine as claimed in claim 5, wherein the said carrier is coupled to the segment at its geometric center so as to move with said center at a constant distance from said line contact between the forme and the pressing surface.

7. A machine for cutting and creasing sheet material, comprising, in combination, a stationary chase, a stationary forme carried by said chase and facing downwardly, a segment of a cylinder mounted beneath the forme and having an arcuate pressing surface, said segment being arranged to be rocked so that its pressing surface rolls against said forme with approximate line contact therebetween, the contact being displaced lengthwise of the forme to and fro as the segment is rocked thereon, sheet feeding means comprising a carrier positioned below the level of the forme and mounted for movement between a rearward position to the rear of and clear of the segment and forme, at which position it can receive a sheet to be fed, and a forward position beneath the forme, the said carrier being arranged to move forwardly from the rearward to the forward position during a forward stroke of the segment so as to feed the said sheet between the forme and the said pressing surface.

8. A machine as claimed in claim 7, wherein the said carrier is coupled to the segment at its geometric center so as to move with said center at a constant distance from said line contact between the forme and the pressing surface.

9. A machine for cutting and creasing sheet material, comprising, in combination, a stationary chase, a stationary forme carried by said chase and facing downwardly, a segment of a cylinder mounted beneath the forme and having an arcuate pressing surface, said segment being arranged to be rocked so that its pressing surface rolls against said forme with approximate line contact therebetween, the contact being displaced lengthwise of the forme as the segment is rocked thereon, a sheet carrier coupled to the segment for movement to and fro in the direction of displacement of line contact between the pressing surface of the segment and the forme, said carrier having a rear part mounted to move rearwardly clear of the forme and the segment as the latter rocks in a rearward stroke, so as to be positioned to receive a sheet, and then to move forwardly to carry said sheet between the forme and the pressing surface of the segment as the segment rocks in a forward stroke, and said carrier having a front part mounted to move beneath the forme and over the pressing surface of the segment, as the segment rocks in a rearward stroke, so as to be positioned beneath the forme to receive a sheet from the forme as said sheet is progressively disengaged by the said pressing surface, and then to move forwardly clear of the forme and the segment as the latter rocks in a forward stroke, so as to carry said sheet clear of the forme and the segment.

10. A machine for cutting and creasing sheet material, comprising, in combination, a stationary chase, a stationary forme carried by said chase and facing downwardly, a segment of a cylinder mounted beneath the forme and having an arcuate pressing surface said segment being arranged to be rocked so that its pressing surface rolls against said forme with approximate line contact therebetween, the contact being displaced lengthwise of the forme as the segment is rocked thereon, a sheet carrier coupled to the segment at its geometric center for movement to and with said center, the carrier comprising a rear part and a front part positioned respectively behind and in front of the said line contact, and below the level of the forme, so that as the segment rocks in a rearward stroke, the carrier moves rearwardly to bring its rear part to a sheet-receiving position clear of the forme and segment, and to bring its front part between the forme and the said pressing surface to receive a finished sheet falling from the forme as said finished sheet is progressively disengaged by the said pressing surface, and as the segment rocks in a forward stroke, the carrier moves forwardly to bring its rear part between the forme and the pressing surface, and to bring its front part clear of the forme and segment so as to carry the said finished sheet clear of the forme and the segment.

References Cited in the file of this patent

UNITED STATES PATENTS

| | | |
|---|---|---|
| 18,567 | Davis | Nov. 3, 1857 |
| 18,618 | Wilcox | Nov. 10, 1857 |
| 516,913 | Butterfield | Mar. 20, 1894 |
| 992,461 | Vandercook | May 16, 1911 |
| 1,489,878 | Bonham | Apr. 8, 1924 |
| 1,938,725 | Seybold | Dec. 12, 1933 |
| 2,405,868 | Whittaker et al. | Aug. 13, 1946 |